(12) United States Patent
Pritchard

(10) Patent No.: US 7,722,304 B2
(45) Date of Patent: May 25, 2010

(54) THREAD LOCKING/PREVAILING TORQUE FASTENER AND FASTENER ASSEMBLY

(75) Inventor: Alan Pritchard, Almeria (ES)

(73) Assignee: Research Engineering & Manufacturing Inc., Middletown, RI (US)

( * ) Notice: Subject to any disclaimer, the term of this patent is extended or adjusted under 35 U.S.C. 154(b) by 0 days.

(21) Appl. No.: 12/189,901

(22) Filed: Aug. 12, 2008

(65) Prior Publication Data

US 2009/0047093 A1    Feb. 19, 2009

Related U.S. Application Data

(60) Provisional application No. 60/955,479, filed on Aug. 13, 2007.

(51) Int. Cl.
*F16B 39/30* (2006.01)
(52) U.S. Cl. .................... 411/308; 411/312
(58) Field of Classification Search ......... 411/308–312, 411/411, 366.1
See application file for complete search history.

(56) References Cited

U.S. PATENT DOCUMENTS

| | | | |
|---|---|---|---|
| 1,250,748 A * | 12/1917 | Woodward | 411/309 |
| 3,426,820 A * | 2/1969 | Phipard, Jr. | 411/310 |
| 3,523,565 A | 8/1970 | Olsen | |
| 3,882,917 A * | 5/1975 | Orlomoski | 411/309 |
| 3,901,066 A * | 8/1975 | Orlomoski | 72/469 |
| 3,927,503 A * | 12/1975 | Wilson | 411/311 |
| 4,252,168 A * | 2/1981 | Capuano | 411/311 |
| 4,820,098 A * | 4/1989 | Taubert et al. | 411/411 |
| 5,000,638 A * | 3/1991 | Essom et al. | 411/386 |
| 5,738,472 A | 4/1998 | Roopnarine et al. | |

FOREIGN PATENT DOCUMENTS

| | | |
|---|---|---|
| JP | 59 019712 A | 2/1984 |
| JP | 2006 057801 A | 3/2006 |
| WO | WO 89/11044 A | 11/1989 |

* cited by examiner

*Primary Examiner*—Gary Estremsky
(74) *Attorney, Agent, or Firm*—Cesari and McKenna, LLP

(57) ABSTRACT

A thread locking fastener assembly comprising a nut anchor defining an internal thread having a longitudinal axis, a leading face and a trailing face, the internal thread, in axial section, having a profile which is symmetric about a first imaginary line extending radially out from the axis, and a fastener shank having an external thread with a longitudinal axis, a leading face and trailing face, the external thread being received in said internal thread so that said axes are substantially coincident. The external thread, in axial section, has a profile with a radially inner base zone which is symmetric about a second imaginary line extending radially from the shank axis and a radially outer deflectable addendum which is not symmetric about that line so that the addendum prevents axial centralization of the external thread profile in the internal thread profile unless a sufficient axial force is applied to the shank to deflect the addendum.

16 Claims, 6 Drawing Sheets

THREAD LOCKING/PREVAILING TORQUE FASTENER AND FASTENER ASSEMBLY

RELATED APPLICATION

This application claims the benefit of Provisional Application No. 60/955,479, filed on Aug. 13, 2007.

BACKGROUND OF THE INVENTION

1. Field of the Invention

This invention relates to a thread locking/prevailing torque fastener assembly and especially to a fastener with an improved external thread profile geometry that optimizes assembly joint integrity.

2. Background Information

In general, it is accepted that the object of having a specially designed external thread on a fastener of the thread-locking type is to create a condition of mating thread interference when the fastener is screwed into a nut anchor that has been pre-tapped in accordance with a known and accepted thread standard such as the I.S.O. standard 965/1. The term "nut anchor" as used herein is meant to include any separate nut or any anchor or support into which the fastener may be threaded.

Such mating thread interference may occur at the thread major or outer diameter as shown in FIG. 1A. That figure shows a fragmentary cross-sectional view of an external screw thread 2 assembled into a pre-tapped internal thread 3 of a nut anchor where thread interference 4 is seen at the outer diameter of the mating threads. The interference is created by having a distance from the pitch diameter 5 of the external thread 2 exceed that of the distance from the pitch diameter 6 of the internal thread to the outside or major diameter of that thread. The magnitude of the interference 4 is that which establishes the thread locking capability of the threaded fastener/nut anchor assembly.

Mating thread interference may also occur at the thread minor or inner diameter shown in FIG. 1B. There, the external thread 7 of a fastener is assembled into a nut anchor with an internal thread 8. An interference seen at 9 at the thread minor diameter creates the thread locking characteristics of the assembly.

A third type of mating thread interference is depicted in FIG. 1C. There, a fastener with an external thread 10 is shown assembled into a nut anchor having an internal thread 11. In this assembly, an interference 12 is created along one of the thread flanks.

In FIGS. 1A to 1C, the head of the fastener with the external thread 2, 7 or 10 is located in the direction of the arrow H.

It is apparent that all of the above known assemblies rely only on mating thread interference to achieve the thread locking effect. It is generally accepted in the industry that the magnitude of the mating thread interference is the governing factor behind the degree of thread locking that can be obtained by any one of the above assemblies. In all of these examples, continued re-use of the threaded fastener causes wear of the mating threads, resulting in a lesser degree of thread locking over time.

While each of the prior thread interference assemblies just described can be effective in particular applications, there are some applications where they do not achieve the desired thread locking effect, with the result that assembly joint integrity may suffer. In other words, the threaded fastener may become loosened when the jointed assembly is subjected to externally applied forces. By the term "jointed assembly" is meant an assembly wherein the threaded fastener has been subjected to a tensile force that is induced in the fastener from the applied torque used to produce an acceptable assembly.

SUMMARY OF THE INVENTION

Accordingly, the present invention aims to provide an improved thread locking-type fastener assembly which produces superior assembly joint integrity when subjected to externally applied forces.

A further object of the invention is to provide a thread locking fastener assembly which can be reused without significantly losing its locking capacity.

Another object of the invention is to provide an assembly of this type which can be used in a variety of different applications.

Still another object is to provide such a fastener assembly which has an enhanced clamp load retention capability.

Yet another object of the invention is to provide a thread locking fastener which, when assembled to a nut anchor, provides one or more of the above advantages.

A further object of the invention is to provide such a fastener which is relatively easy and inexpensive to make in quantity.

Still another object of the invention is to provide a fastener of this type whose shank can have a cylindrical or lobular configuration.

Other objects will, in part, be obvious and will, in part, appear hereinafter.

The invention accordingly comprises the features of construction, combination of elements and arrangement of parts which will be exemplified in the following detailed description, and the scope of the invention will be indicated in the claims.

In general, my invention uses the thread interference developed at the major or outer diameters of mating fastener and nut anchor threads to enhance overall thread locking performance by including a specially designed addendum on the fastener thread to store residual energy in the thread created by deflection of the addendum when the fastener is tightened in the nut anchor to effect an assembly.

As will be described in more detail later, the utilization of the residual or stored energy in the fastener thread is best utilized when the deflection of the thread addendum does not exceed that which would cause a permanent deformation of the fastener thread addendum. That is, the deflection is best kept within the "limit of proportionality" of the fastener thread material and geometry.

In accordance with the invention, the fastener has a threaded shank with an axial core and a helical thread formed on the core. The axial cross-sectional profile of the thread provides a radially inner thread base zone extending from the core to an imaginary datum line spaced from and parallel to the core axis. The profile also provides a radially outer thread addendum which extends from the datum line to the tip of the thread and which is deflectable. The thread base and addendum are bounded by leading and trailing faces extending from the core to the tip. The trailing face has a radially inner portion and a radially outer portion which join at the datum line so as to define an included angle less than 180° so that when the fastener is threaded into a nut anchor and the trailing face of the fastener thread is drawn against the leading face of the nut anchor thread with a selected force, the thread addendum is deflected so as to increase the included angle thereby storing residual energy in the fastener thread, resulting in a jointed assembly with enhanced joint integrity and clamp load retention.

BRIEF DESCRIPTION OF THE DRAWINGS

For a fuller understanding of the nature and objects of the invention, reference should be made to the following detailed description, taken in connection with the accompanying drawings, in which.

DESCRIPTION OF A PREFERRED EMBODIMENT

Figure 2:
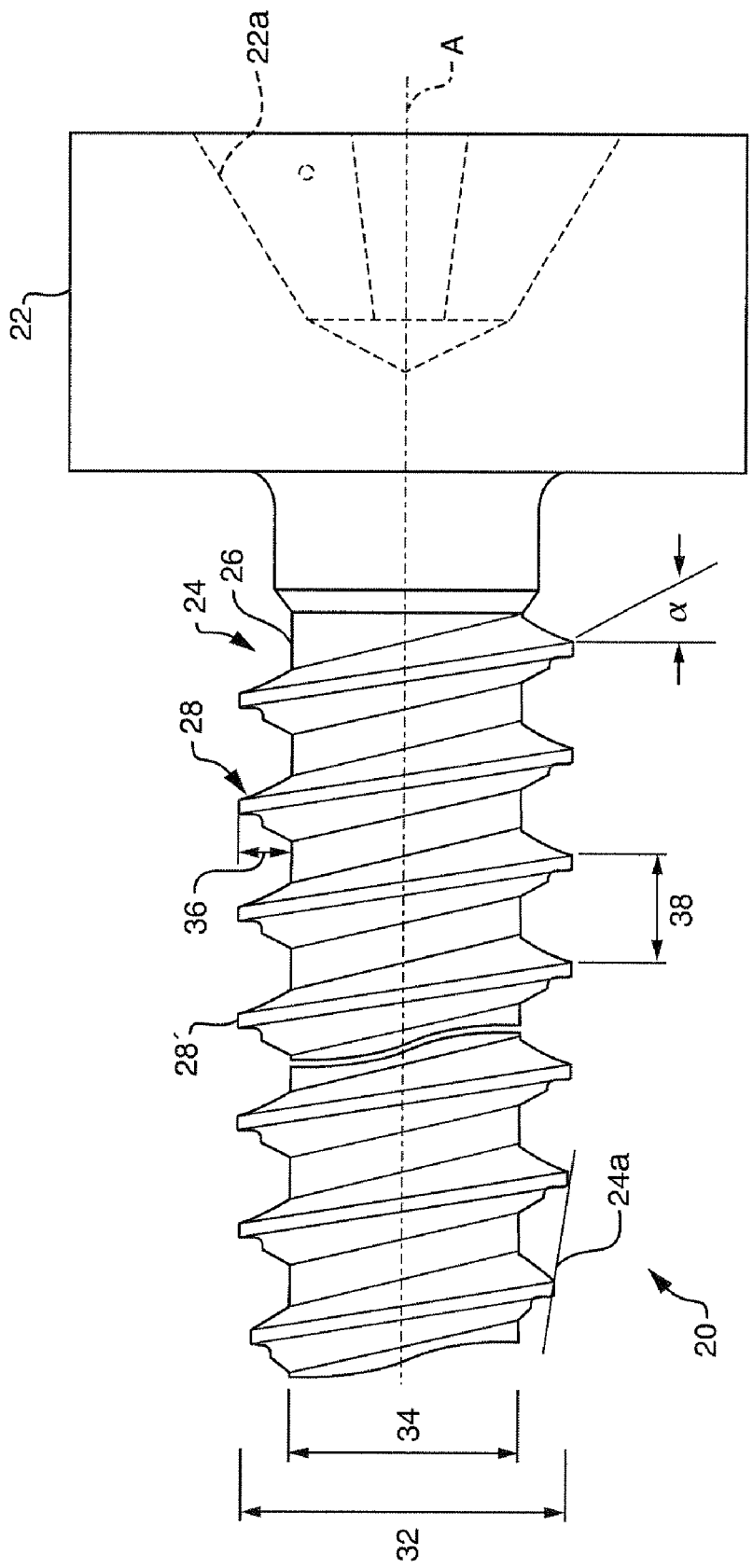
FIG. 2 is a fragmentary side elevational view of a thread locking fastener having a thread profile according to the invention.
Figure 4:
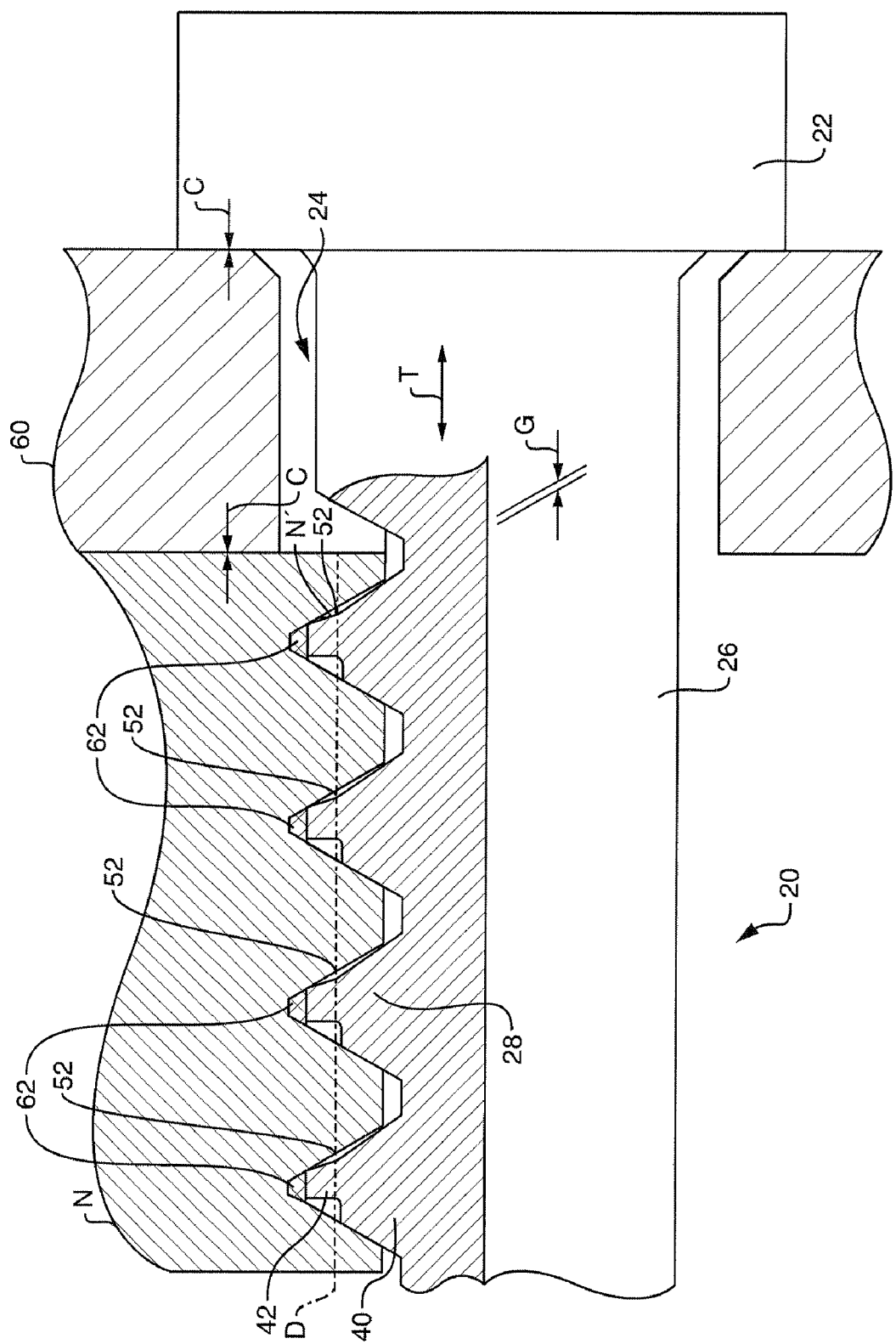
FIG. 4 is a side elevational view with parts in section showing the FIG. 2 fastener assembled to a nut anchor but before tension is applied to the fastener shank.
Figure 6:
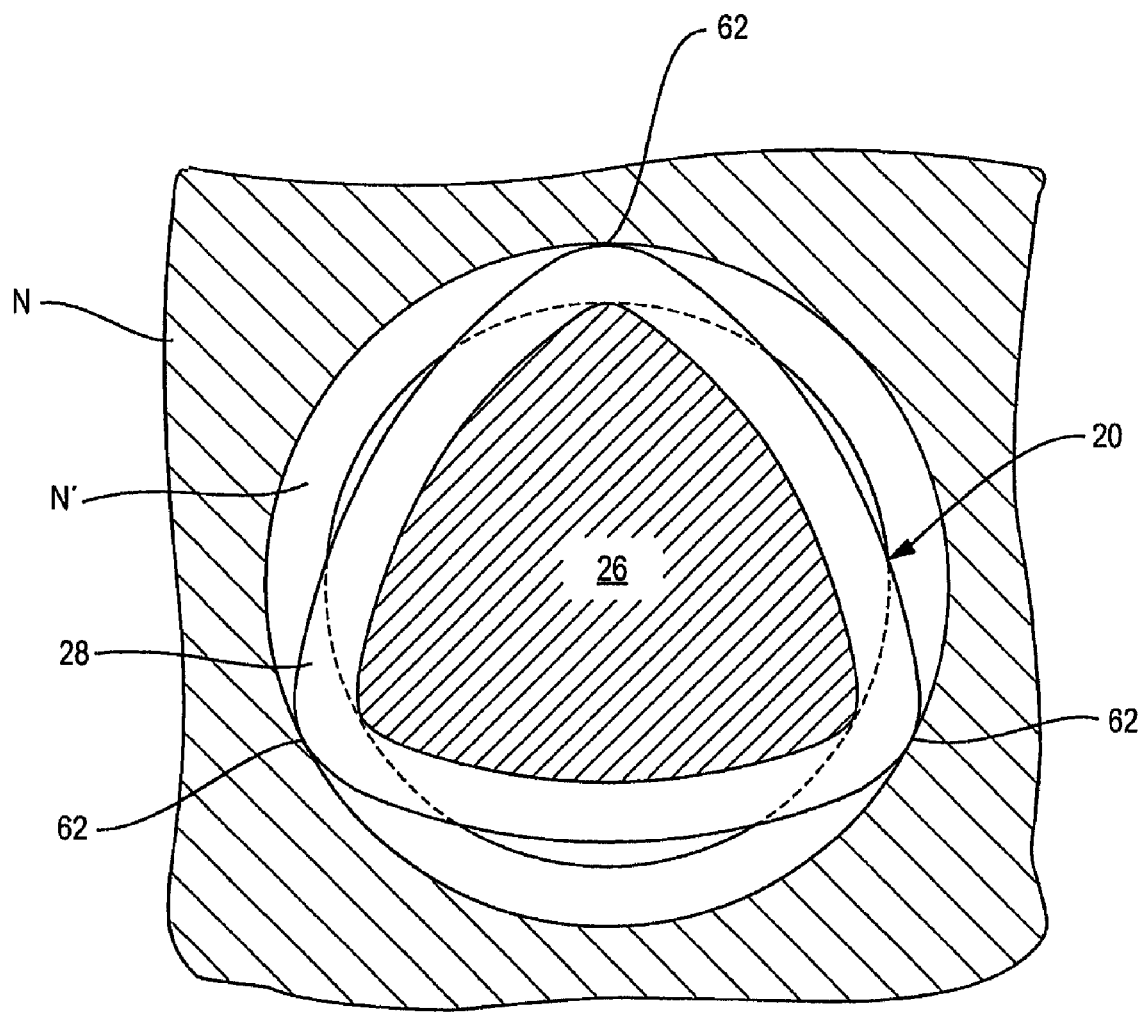
FIG. 6 is a cross-sectional view of a trilobal fastener incorporating the invention.

Referring to FIG. 2, a thread locking fastener 20 incorporating the invention includes a drive head 22 and a shank indicated generally at 24 extending from the head along a central axis A. The head may be of any desired type or configuration and may contain a slot or recess 22a as shown, or a projection, that facilitates rotation of the fastener. Also, while the illustrated shank 24 has a generally circular cross-section, it could also have a lobular cross-sectional form. For example, it may have a trilobal cross-section as described, for example, in U.S. Pat. No. 3,195,156 and shown in FIG. 6. Depending upon the particular application, the shank may have as many as seven lobes. Preferably, a free end segment of shank 24 is tapered as indicated at 24a to facilitate insertion of the fastener into a nut anchor N (FIG. 4).

Shank 24 includes a core 26 having a thread 28 generated on a helical form around core 26. This thread, which in axial section has a profile 28', may extend the entire length of the core or along a portion thereof. The thread has a major or outer diameter 32, a minor or inner diameter 34 and a thread profile height 36 that is usually constant for a given size fastener. The magnitude of the helix or spiral angle α of the thread is determined by direct relationships between the outer diameter 34 and the thread's axial pitch 38. Usually, the axial pitch will be in accordance with that of the pre-tapped thread in the nut anchor chosen by the assembly fabricator.

Figure 3:
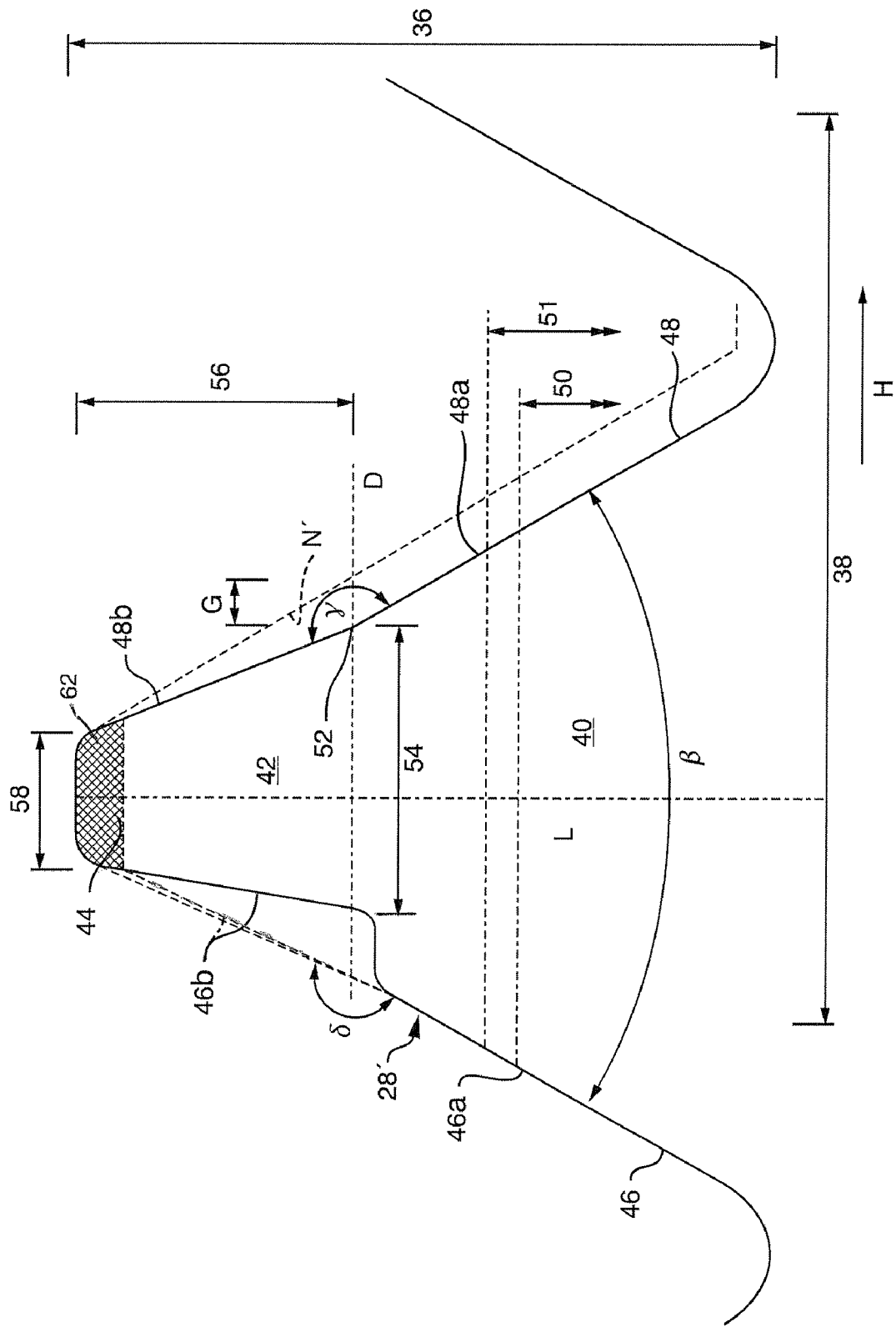
FIG. 3 is a schematic diagram, on a much larger scale, showing the thread profile of the FIG. 2 fastener.

Refer now to FIG. 3, which shows the thread profile 28' of thread 28 in greater detail. The thread profile 28' comprises a radially inner area or base zone 40 extending from the core 26 (FIG. 2) to an imaginary datum line D lying parallel to the core, and a radially outer zone or addendum 42 extending from datum line D to a thread tip 44. The two zones 40 and 42 are bounded by a thread profile leading face 46 and a trailing face 48.

As seen from FIG. 3, these faces include radially inner portions 46a and 48a, respectively, which have their roots at core 26 and which converge so that base 40 is symmetrical about an elevation line L extending perpendicular to the core and shank axis A (FIG. 2). Preferably, the base 40 is bisected by line L and defines an included angle β and is in accordance with a pitch diameter 50 for a standard known thread form, the nut anchor N having a compatible pitch diameter 51.

Above the datum line D, the addendum 42 is non-symmetrical about line L and it has a leading face portion 46b and a trailing face portion 48b. The face portion 48b intersects face portion 48a at a critical point 52 on datum line D and defines with the latter an included angle γ in the range of 158° to 162°, preferably 160°. The leading face portion 46b may be more or less an extension of portion 46a as shown by a broken line in FIG. 3. More preferably, that leading face is notched as shown in solid lines in that figure so that the addendum 42 has a selected width 54 at datum line D. The minimum notch should be where angle δ in FIG. 3 is about 165° and intersects leading face portion 46a at its intersection with datum line D as shown in phantom in that figure. The illustrated addendum also has a selected height 56 and a selected width 58 at tip 44. As we shall see, the tip width 58 together with the addendum height 56 are used together and proportioned so as to provide interference between the outside diameter of the thread addendum 42 and the major diameter of the internal thread of the nut anchor N (FIG. 4), i.e. similar to the interference 4 in FIG. 1A.

Refer now to FIG. 4, which shows an assembly comprising a fastener 20 threaded into a pretapped nut anchor N, there being a workpiece in the form of a plate 60 disposed between the fastener head 22 and the nut anchor N. When the fastener head 22 is rotated clockwise, the helical thread formed on the fastener shank creates an axial forward (left) movement of the fastener into the thread of the nut anchor. It can be seen from FIG. 4 that the engagement of the external thread of the fastener and the internal thread of the nut anchor creates a radial interference (emphasized) at 62 at the crests of the thread 28. The force required to overcome this radial interference and to allow an assembly to be effected is referred to herein as "prevailing torque". This prevailing torque has to be overcome in order for the opposing faces of the nut anchor N and plate 60 as well as the opposing faces of that plate and the fastener head 22 to contact one another.

FIG. 4 shows the assembly wherein these conditions have been met. In other words, in the illustrated position of the assembly components, the compression loads C are zero and the induced fastener shank tensile force T is zero. Also with these conditions, the leading face N' of each thread of the nut anchor N is spaced from the trailing face of the corresponding thread 28 of fastener 20 except where they interfere radially at 62. This is seen more clearly in FIG. 3 where the leading face N' of the nut anchor is shown as a broken line. Under these conditions, the thread addendum 42 is still in a natural unstressed and undeflected state and is spaced from the nut thread face N' other than at interference 62 from which prevailing torque is created during assembly of the fastener into the nut anchor.

Figure 5:
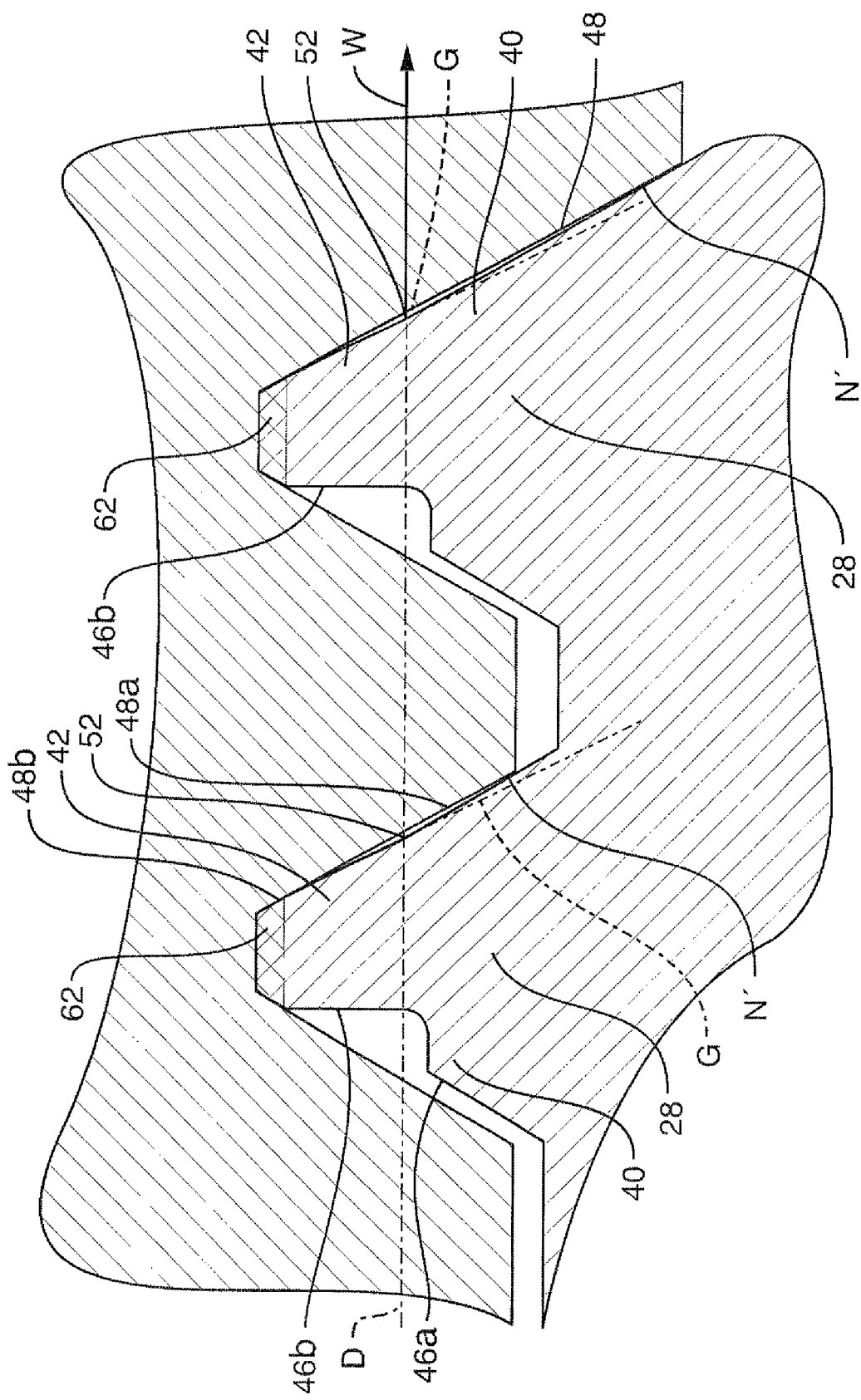
FIG. 5 is a diagrammatic view, on a much larger scale, showing a part of the FIG. 4 assembly after tension is applied to the fastener shank.

Referring now to FIGS. 4 and 5, continued clockwise rotation of fastener 20 will subject the fastener thread 28 to a tensile force T that will develop an axial force W that will be applied to each thread 28 convolution at the critical point 52 (FIGS. 4 and 5) thereby causing the corresponding thread addendum 42 to deflect (to the left in FIG. 5) by an amount G. This deflection will develop positive clamp loads C at the opposing faces of the fastener head 22, plate 60 and nut anchor N as shown in FIG. 4. The deflection of each addendum 42 continues until there is substantially no gap between the trailing face 48 of each thread convolution and the leading face N' of the corresponding nut anchor thread, i.e. until the thread faces 48a and 48b of thread profile 28' in FIG. 3 are relatively straight as shown in solid lines in FIG. 5. It should be noted that the fastener effective pitch diameter 50 of thread 28 and the effective pitch diameter 51 of the nut anchor N shown in FIG. 3 are integral parts in establishing the amount of the addendum deflection G. In any event, at this juncture, there will have been achieved the maximum clamp load C that can be developed by the external thread addendum deflection.

It should be noted that the base 40 of thread 28, being rigid, does not deflect to any appreciable extent. The axial force W applied at the critical point 52 in FIG. 5 is below the maximum induced tensile load T, and the deflection of the addendum 42 is within the "limit of proportionality" of the thread addendum geometry and the fastener material such that the addendum does not achieve a condition of permanent set. In other words, the elastic limit of the thread is not exceeded. Thus, should relaxation of the induced fastener tension T occur, there will remain a force acting at the outer ends of the trailing face portions 48b, i.e. at radial interferences 62 (FIG. 5), which will maintain a proportion of the compressive forces C within the assembly, even after the tensile force T has lessened.

Figure 1A:
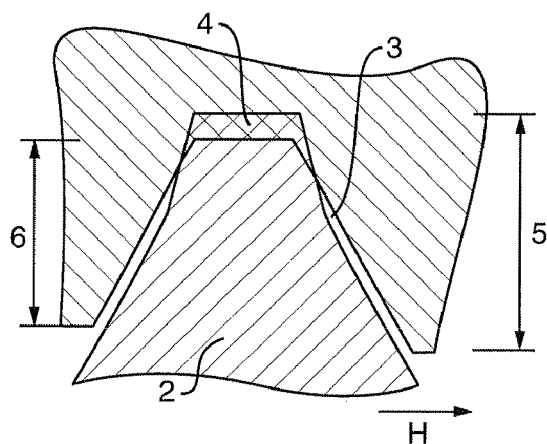
FIGS. 1A to 1C, already described, are diagrammatic views showing in section external/internal self locking thread assemblies wherein thread locking interference is created, respectively, at the thread major or outer diameter, at the thread minor or inner diameter, and at one of the thread flanks.
Figure 1B:
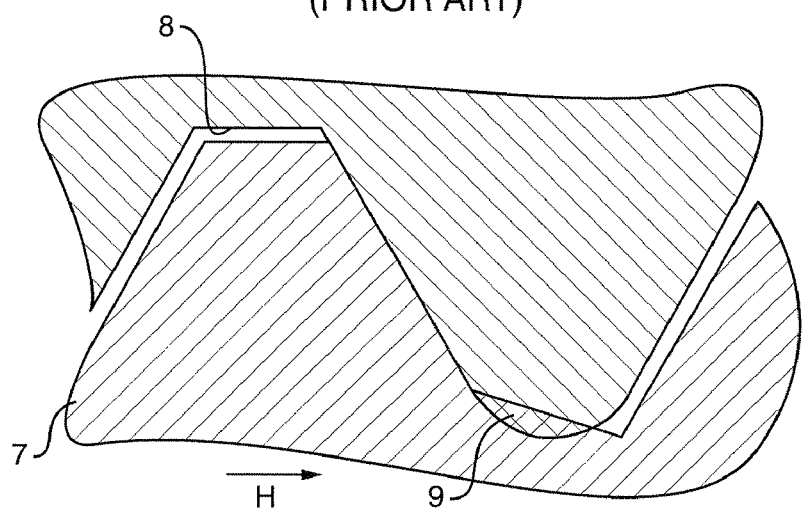
Figure 1C:
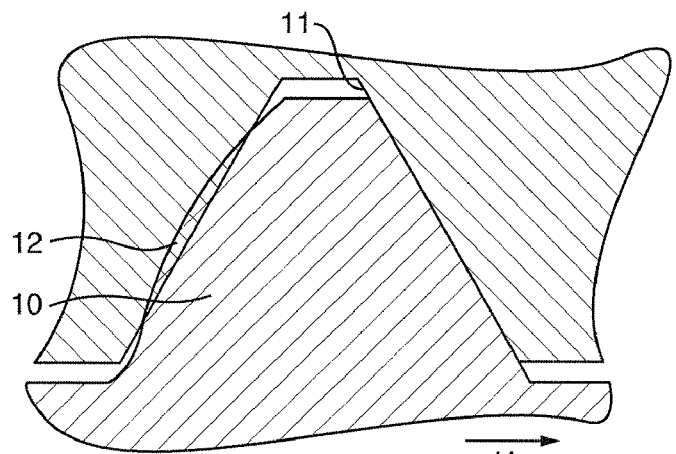

Thus, it is the energy stored in the deflected addendum 42 that adds to and retains clamp load forces beyond those that can be developed using conventional thread locking assemblies such as those depicted in FIGS. 1A to 1C. In other words, the thread addendum deflection and the residual energy stored within the thread provide an added mechanical means that supplements the radial interference 62 that occurs at the tips of the threads, thus enhancing the joint integrity of my assembly as compared to known assemblies of this general type.

As noted above, it is preferred that the leading face of the fastener thread 28 be notched. The preference for the notch is to ensure that when the thread addendum 42 is deflected as depicted in FIG. 5, the force required to produce the desired deflection is below that of the total tensile force T that would be induced in the fastener 20 when it is tightened correctly. Thus, the notch is present to provide an acceptable "moment of inertia" of the thread addendum that is developed by the geometrical relationships between the addendum base width 54, addendum height 56 and tip width 58 shown in FIG. 3.

The leading face portion 46b of the thread addendum 42 need not be notched should the assembly design have no requirement for thread addendum deflection G to be established under forces that are below those of the tensile strength of the fastener 20.

Various modifications and additions can be made to my fastener without departing from the scope of the invention. For example, the leading and trailing portions of the thread profile 28' can have a number of shapes designed to address particular purposes. Also, the pitch and size of thread profile 28' may vary depending upon the material of nut anchor N. In addition, although the deflection of the thread addendum 42 is an integral part of the invention, it should not be assumed that the illustrations given by way of example cannot be modified in a way to achieve the above described clamp load retention to which the invention relates. Also, other design parameters can be based upon and varied in accordance with the materials of which the fastener and/or nut anchor are made.

It should be noted too that the present fastener may be made using the same processes used to manufacture other, more conventional fasteners of this general type that do not have the above described enhanced thread locking capability and at a similar cost. Therefore, it should have wide application.

It will thus be seen that the objects set forth above among those made apparent from the preceding description are efficiently attained. Also, various other changes may be made in the above construction without departing from the scope of the invention. Therefore, it is intended that all matter contained in the above description or shown in the accompanying drawings shall be interpreted as illustrative and not in a limiting sense.

It is also to be understood that the following claims are intended to cover all the generic and specific features of the invention described herein.

What is claimed is:

1. A thread locking fastener comprising a shank including a core having a longitudinal axis and an external thread whose profile in axial section provides a radially inner, relatively rigid base extending out along a radius from the core to an imaginary datum line spaced from and parallel to said axis, a radially outer deflectable addendum extending along said radius from the datum line to a tip at the major diameter of the thread, said base and addendum being bounded by thread leading and trailing faces extending from the core to the tip, said trailing face having a radially inner, substantially straight portion extending from the core to a point on said datum line and a radially outer, substantially straight portion extending from said point on the datum line to said tip, said radially inner and outer straight portions defining an obtuse exterior included angle and wherein said addendum is deflectable about said point so that when the trailing face is drawn against the leading face of a nut anchor thread with a selected force, the addendum deflects so as to increase said included angle to a maximum of 180°.

2. The fastener defined in claim 1 wherein the base has the shape of a regular trapezoid that is symmetrical about an elevation line extending along said radius and the addendum is non-symmetrical about said elevation line.

3. The fastener defined in claim 2 wherein said leading face is notched at or above said datum line to reduce said selected force required to deflect the addendum.

4. The fastener defined in claim 1 wherein the shank has a lobal cross-section.

5. The fastener defined in claim 4 wherein the shank cross-section is trilobal.

6. The fastener defined in claim 1 wherein said included angle is 158° to 162°.

7. A thread locking fastener assembly comprising
a nut anchor defining an internal thread having a longitudinal axis and a major diameter, a leading face and a trailing face, said internal thread, in axial section, having a profile which is symmetric about a first imaginary line extending radially out from said axis, and
a fastener having a head and a shank extending from the head, said shank having an external thread with a longitudinal axis, a leading face and a trailing face, said external thread being received in said internal thread so that said axes are substantially coincident, said external thread, in axial cross-section, having a profile with a radially inner base zone which is symmetric about a radius line extending from the shank thread axis and a radially outer deflectable addendum which extends out along said radius line to a tip at the major diameter of the thread, the trailing face of the external thread being composed of a substantially straight trailing face portion of the base zone and a substantially straight trailing face portion of the addendum which meet at a point and together define an obtuse exterior included angle so that the addendum prevents axial centralization of the external thread profile in the internal thread profile until the fastener is tightened into the nut anchor enough to seat said head and apply a sufficient axial force to the shank to deflect the addendum so as to increase said included angle to a maximum of 180°.

8. The assembly defined in claim 7 wherein the leading face of the external thread is notched at said addendum to facilitate said deflection.

9. The assembly defined in claim 7 wherein the internal thread has a circular cross-section, the external thread has a lobular cross-section and said addendum is dimensioned so that only its tip interferes with the internal thread at the major diameter thereof before and after the deflection of the addendum.

10. The assembly defined in claim 9 wherein the external thread has lobes.

11. The assembly defined in claim 10 wherein the external thread is trilobal.

12. A thread locking fastener assembly comprising a nut anchor defining an internal thread with a longitudinal axis and oppositely inclined leading and trailing faces with a predetermined standard inclination, said internal thread, in cross-section, having a circular perimeter, and a fastener including a head and a shank extending from the head, said shank having an external thread with a longitudinal axis, a leading face and a trailing face, said external thread being received in said internal thread so that said axes are substantially coincident, said external thread, in axial section, having a profile with a radially inner base zone having a trailing face portion with substantially the same inclination as said leading face of the internal thread and a radially outer deflectable addendum having a trailing face portion which defines with the trailing face portion of the base zone an obtuse exterior included angle and which engages the internal thread only at said perimeter thereof under a predetermined assembly preload, said addendum preventing axial centralization of the external thread in the internal thread under said preload until said fastener is tightened into the nut anchor enough to seat said head and apply a sufficient axial force to said shank to deflect the addendum so as to increase said included angle to a maximum of 180°.

13. The assembly defined in claim 12 wherein the leading face of the external thread is notched at said addendum to facilitate said deflection.

14. The assembly defined in claim 12 wherein said perimeter has lobes.

15. The assembly defined in claim 14 wherein said perimeter is trilobal.

16. The assembly defined in claim 12 wherein said included angle before the increase is 158° to 162°.

* * * * *

UNITED STATES PATENT AND TRADEMARK OFFICE
CERTIFICATE OF CORRECTION

| | | |
|---|---|---|
| PATENT NO. | : 7,722,304 B2 | Page 1 of 1 |
| APPLICATION NO. | : 12/189901 | |
| DATED | : May 25, 2010 | |
| INVENTOR(S) | : Alan Pritchard | |

It is certified that error appears in the above-identified patent and that said Letters Patent is hereby corrected as shown below:

Title page:
Related U.S. Application Data should read
(60) Provisional application No. 60/955,476, filed on Aug. 13, 2007.

In the Specification:
Col. 1, line 7 should read
tion No. 60/955,476, filed on Aug. 13, 2007.

Signed and Sealed this
Tenth Day of November, 2015

Michelle K. Lee
*Director of the United States Patent and Trademark Office*